United States Patent [19]

Johnson et al.

[11] Patent Number: 5,232,040
[45] Date of Patent: Aug. 3, 1993

[54] METHOD FOR REDUCING METAL CONTENT OF SELF-SUPPORTING COMPOSITE BODIES AND ARTICLES FORMED THEREBY

[75] Inventors: William B. Johnson; James C. Wang, both of Newark, Del.

[73] Assignee: Lanxide Technology Company, LP, Newark, Del.

[21] Appl. No.: 794,607

[22] Filed: Nov. 15, 1991

Related U.S. Application Data

[63] Continuation of Ser. No. 551,288, Jul.-12, 1990, abandoned.

[51] Int. Cl.$^5$ .................. B22D 19/02; B22D 19/14
[52] U.S. Cl. ................................... 164/91; 164/98; 164/69.1; 264/44; 264/344
[58] Field of Search ............. 164/91, 97, 98, 100–105, 164/69.1; 264/344, 48, 60, 44

[56] References Cited

U.S. PATENT DOCUMENTS

| | | | |
|---|---|---|---|
| 3,758,662 | 9/1973 | Tobin | 264/332 |
| 3,864,154 | 2/1975 | Gazza et al. | 29/123 B |
| 4,353,714 | 10/1982 | Lee et al. | 419/57 X |
| 4,471,059 | 9/1984 | Yoshino et al. | 501/96 |
| 4,492,670 | 1/1985 | Mizrah et al. | 419/12 |
| 4,544,524 | 10/1985 | Mizrah et al. | 419/12 |
| 4,585,618 | 4/1986 | Fresnel et al. | 419/12 |
| 4,595,545 | 1/1986 | Sane | 269/65 |
| 4,596,693 | 6/1986 | Ishizuka et al. | 419/16 |
| 4,605,440 | 8/1986 | Halverson | 75/238 |
| 4,692,418 | 8/1987 | Boecker et al. | 501/90 |
| 4,702,770 | 10/1987 | Pyzik | 75/236 |
| 4,713,360 | 12/1987 | Newkirk et al. | 501/87 |
| 4,718,941 | 1/1988 | Halverson | 75/236 |
| 4,737,328 | 4/1988 | Morelock | 264/62 |
| 4,777,014 | 10/1988 | Newkirk et al. | 419/12 |
| 4,781,873 | 11/1988 | Ford | 264/44 |
| 4,793,968 | 12/1988 | Mosser et al. | 419/17 X |
| 4,806,508 | 2/1989 | Dwivedi et al. | 501/94 |
| 4,820,498 | 4/1989 | Newkirk | 264/344 |
| 4,828,008 | 5/1989 | White | 164/97 |
| 4,834,938 | 5/1989 | Pyzik et al. | 419/6 |
| 4,868,143 | 9/1989 | Newkirk | 264/344 |
| 4,871,495 | 10/1989 | Helferich | 264/43 |
| 4,871,696 | 10/1989 | Newkirk et al. | 501/94 |
| 4,874,569 | 10/1989 | Kuszyk et al. | 264/60 |
| 4,885,130 | 12/1989 | Claar et al. | 419/12 |
| 4,885,131 | 12/1989 | Newkirk | 419/12 |
| 4,891,338 | 1/1990 | Gesing et al. | 501/87 |
| 4,915,736 | 4/1990 | Claar et al. | 75/238 |
| 4,916,113 | 4/1990 | Newkirk et al. | 501/89 |
| 4,940,679 | 7/1990 | Claar et al. | 501/96 |
| 5,004,714 | 4/1991 | Claar et al. | 501/134 |
| 5,010,044 | 4/1991 | Newkirk | 501/93 |
| 5,010,063 | 4/1991 | Claar | 228/122 |
| 5,017,334 | 5/1991 | Claar et al. | 419/12 |
| 5,019,539 | 5/1991 | Claar et al. | 501/87 |
| 5,063,185 | 11/1991 | Dwivedi et al. | 501/126 |

FOREIGN PATENT DOCUMENTS

| | | |
|---|---|---|
| 0165707 | 12/1985 | European Pat. Off. . |
| 0193292 | 9/1986 | European Pat. Off. . |
| 0239520 | 9/1987 | European Pat. Off. . |
| 1492477 | 11/1977 | United Kingdom . |
| 2156718 | 10/1985 | United Kingdom ............ 164/102 |

*Primary Examiner*—Richard K. Seidel
*Assistant Examiner*—Rex E. Pelto
*Attorney, Agent, or Firm*—Mark G. Mortenson; Jeffrey R. Ramberg

[57] ABSTRACT

This invention relates generally to a novel method for removing metal from a formed self-supporting body. A self-supporting body is made by reactively infiltrating a molten parent metal into a bed or mass containing a boron source material and a carbon source material (e.g., boron carbide) and/or a boron source material and a nitrogen source material (e.g., boron nitride) and, optionally, one or more inert fillers. Once the self-supporting body is formed, it is then placed, at least partially, into contact with another material which causes metallic constituent contained in the self-supporting body to be at least partially removed.

20 Claims, 2 Drawing Sheets

METHOD FOR REDUCING METAL CONTENT OF SELF-SUPPORTING COMPOSITE BODIES AND ARTICLES FORMED THEREBY

This application is a continuation of copending application Ser. No. 07/551,288 filed on Jul. 12, 1990, now abandoned.

FIELD OF THE INVENTION

This invention relates generally to a novel method for removing metal from a formed self-supporting body. A self-supporting body is made by reactively infiltrating a molten parent metal into a bed or mass containing a boron source material and a carbon source material (e.g., boron carbide) and/or a boron source material and a nitrogen source material (e.g., boron nitride) and, optionally, one or more inert fillers. Once the self-supporting body is formed, it is then placed, at least partially, into contact with another material which causes metallic constituent contained in the self-supporting body to be at least partially removed.

BACKGROUND OF THE PRESENT INVENTION

In recent years, there has been an increasing interest in the use of ceramics for structural applications historically served by metals. The impetus for this interest has been the superiority of ceramics with respect to certain properties, such as corrosion resistance, hardness, wear resistance, modulus of elasticity, and refractory capabilities when compared with metals.

However, a major limitation on the use of ceramics for such purposes is the feasibility and cost of producing the desired ceramic structures. For example, the production of ceramic boride bodies by the methods of hot pressing, reaction sintering and reaction hot pressing is well known. In the case of hot pressing, fine powder particles of the desired boride are compacted at high temperatures and pressures. Reaction hot pressing involves, for example, compacting at elevated temperatures and pressures boron or a metal boride with a suitable metal-containing powder. U.S. Pat. No. 3,937,619 to Clougherty describes the preparation of a boride body by hot pressing a mixture of powdered metal with a powdered diboride, and U.S. Pat. No. 4,512,946 to Brun describes hot pressing ceramic powder with boron and a metal hydride to form a boride composite.

However, these hot pressing methods require special handling and expensive special equipment, they are limited as to the size and shape of the ceramic part produced, and they typically involve low process productivities and high manufacturing cost.

A second major limitation on the use of ceramics for structural applications is their general lack of toughness (i.e. damage tolerance or resistance to fracture). This characteristic tends to result in sudden, easily induced, catastrophic failure of ceramics in applications involving even rather moderate tensile stresses. This lack of toughness tends to be particularly common in monolithic ceramic boride bodies.

One approach to overcome this problem has been to attempt to use ceramics in combination with metals, for example, as cermets or metal matrix composites. The objective of this approach is to obtain a combination of the best properties of the ceramic (e.g. hardness and/or stiffness) and the metal (e.g. ductility). U.S. Pat. No. 4,585,618 to Fresnel, et al., discloses a method of producing a cermet whereby a bulk reaction mixture of particulate reactants, which react to produce a sintered self-sustaining ceramic body, is reacted while in contact with a molten metal. The molten metal infiltrates at least a portion of the resulting ceramic body. Exemplary of such a reaction mixture is one containing titanium, aluminum and boron oxide (all in particulate form), which is heated while in contact with a pool of molten aluminum. The reaction mixture reacts to form titanium diboride and alumina as the ceramic phase, which is infiltrated by the molten aluminum. Thus, this method uses the aluminum in the reaction mixture principally as a reducing agent. Further, the external pool of molten aluminum is not being used as a source of precursor metal for a boride forming reaction, but rather it is being utilized as a means to fill the pores in the resulting ceramic structure. This creates cermets which are wettable and resistant to molten aluminum. These cermets are particularly useful in aluminum production cells as components which contact the molten aluminum produced but preferably remain out of contact with the molten cryolite.

European Application 0,113,249 to Reeve, et al. discloses a method for making a cermet by first forming in situ dispersed particles of a ceramic phase in a molten metal phase, and then maintaining this molten condition for a time sufficient to effect formation of an intergrown ceramic network. Formation of the ceramic phase is illustrated by reacting a titanium salt with a boron salt in a molten metal such as aluminum. A ceramic boride is developed in situ and becomes an intergrown network. There is, however, no infiltration, and further the boride is formed as a precipitate in the molten metal. Both examples in the application expressly state that no grains were formed of $TiAl_3$, $AlB_2$, or $AlB_{12}$, but rather $TiB_2$ is formed demonstrating the fact that the aluminum is not the metal precursor to the boride.

U.S. Pat. No. 3,864,154 to Gazza, et al. discloses a ceramic-metal system produced by infiltration. An $AlB_{12}$ compact was impregnated with molten aluminum under vacuum to yield a system of these components. Other materials prepared included $SiB_6$-Al, B-Al; $B_4C$-Al/Si; and $AlB_{12}$-B-Al. There is no suggestion whatsoever of a reaction, and no suggestion of making composites involving a reaction with the infiltrating metal nor of any reaction product embedding an inert filler or being part of a composite.

U.S. Pat. No. 4,605,440 to Halverson, et al., discloses that in order to obtain $B_4C$-Al composites, a $B_4C$-Al compact (formed by cold pressing a homogeneous mixture of $B_4C$ and Al powders) is subjected to sintering in either a vacuum or an argon atmosphere. There is no infiltration of molten metal from a pool or body of molten precursor metal into a preform. Further, there is no mention of a reaction product embedding an inert filler in order to obtain composites utilizing the favorable properties of the filler.

While these concepts for producing cermet materials have in some cases produced promising results, there is a general need for more effective and economical methods to prepare boride-containing materials.

DISCUSSION OF RELATED PATENTS AND PATENT APPLICATIONS

Many of the above-discussed problems associated with the production of boride-containing materials have been addressed in U.S. Pat. No. 4,885,130 (hereinafter "Patent '130"), which issued on Dec. 5, 1989, in the names of Danny R. White, Michael K. Aghajanian and T. Dennis Claar, and is entitled "Process for Preparing Self-Supporting Bodies and Products Made Thereby".

Briefly summarizing the disclosure of Patent '130, self-supporting ceramic bodies are produced by utilizing a parent metal infiltration and reaction process (i.e., reactive infiltration) in the presence of a mass comprising boron carbide. Particularly, a bed or mass comprising boron carbide and, optionally, one or more of a boron donor material and a carbon donor material, is infiltrated by molten parent metal, and the bed may be comprised entirely of boron carbide or only partially of boron carbide, thus resulting in a self-supporting body comprising, at least in part, one or more parent metal boron-containing compounds, which compounds include a parent metal boride or a parent metal boro carbide, or both, and typically also may include a parent metal carbide. It is also disclosed that the mass comprising boron carbide which is to be infiltrated may also contain one or more inert fillers mixed with the boron carbide. Accordingly, by combining an inert filler, the result will be a composite body having a matrix produced by the reactive infiltration of the parent metal, said matrix comprising at least one boron-containing compound, and the matrix may also include a parent metal carbide, the matrix embedding the inert filler. It is further noted that the final composite body product in either of the above-discussed embodiments (i.e., filler or no filler) may include a residual metal as at least one metallic constituent of the original parent metal.

Broadly, in the disclosed method of Patent '130, a mass comprising boron carbide and, optionally, one or more of a boron donor material and a carbon donor material, is placed adjacent to or in contact with a body of molten metal or metal alloy, which is melted in a substantially inert environment within a particular temperature envelope. The molten metal infiltrates the mass comprising boron carbide and reacts with at least the boron carbide to form at least one reaction product. The boron carbide (and/or the boron donor material and/or the carbon donor material) is reducible, at least in part, by the molten parent metal, thereby forming the parent metal boron-containing compound (e.g., a parent metal boride and/or boro compound under the temperature conditions of the process). Typically, a parent metal carbide is also produced, and in certain cases, a parent metal boro carbide is produced. At least a portion of the reaction product is maintained in contact with the metal, and molten metal is drawn or transported toward the unreacted mass comprising boron carbide by a wicking or a capillary action. This transported metal forms additional parent metal, boride, carbide, and/or boro carbide and the formation or development of a ceramic body is continued until either the parent metal or mass comprising boron carbide has been consumed, or until the reaction temperature is altered to be outside of the reaction temperature envelope. The resulting structure comprises one or more of a parent metal boride, a parent metal boro compound, a parent metal carbide, a metal (which, as discussed in Patent '130, is intended to include alloys and intermetallics), or voids, or any combination thereof. Moreover, these several phases may or may not be interconnected in one or more dimensions throughout the body. The final volume fractions of the boron-containing compounds (i.e., boride and boron compounds), carbon-containing compounds, and metallic phases, and the degree of interconnectivity, can be controlled by changing one or more conditions, such as the initial density of the mass comprising boron carbide, the relative amounts of boron carbide and parent metal, alloys of the parent metal, dilution of the boron carbide with a filler, the amount of boron donor material and/or carbon donor material mixed with the mass comprising boron carbide, temperature, and time. Preferably, conversion of the boron carbide to the parent metal boride, parent metal boro compound(s) and parent metal carbide is at least about 50%, and most preferably at least about 90%.

The typical environment or atmosphere which was utilized in Patent '130 was one which is relatively inert or unreactive under the process conditions. Particularly, it was disclosed that an argon gas, or a vacuum, for example, would be suitable process atmospheres. Still further, it was disclosed that when zirconium was used as the parent metal, the resulting composite comprised zirconium diboride, zirconium carbide, and residual zirconium metal. It was also disclosed that when aluminum parent metal was used with the process, the result was an aluminum boro carbide such as $Al_3B_{48}C_2$, $AlB_{12}C_2$ and/or $AlB_{24}C_4$, with aluminum parent metal and other unreacted unoxidized constituents of the parent metal remaining. Other parent metals which were disclosed as being suitable for use with the processing conditions included silicon, titanium, hafnium, lanthanum, iron, calcium, vanadium, niobium, magnesium, and beryllium.

Still further, it is disclosed that by adding a carbon donor material (e.g., graphite powder or carbon black) and/or a boron donor material (e.g., a boron powder, silicon borides, nickel borides and iron borides) to the mass comprising boron carbide, the ratio of parent metal-boride/parent metal-carbide can be adjusted. For example, if zirconium is used as the parent metal, the ratio of $ZrB_2/ZrC$ can be reduced if a carbon donor material is utilized (i.e., more $ZrC$ is produced due to the addition of a carbon donor material in the mass of boron carbide) while if a boron donor material is utilized, the ratio of $ZrB_2/ZrC$ can be increased (i.e., more $ZrB_2$ is produced due to the addition of a boron donor material in the mass of boron carbide). Still further, the relative size of $ZrB_2$ platelets which are formed in the body may be larger than platelets that are formed by a similar process without the use of a boron donor material. Thus, the addition of a carbon donor material and/or a boron donor material may also effect the morphology of the resultant material.

In another related Patent, specifically, U.S. Pat. No. 4,915,736 (hereinafter referred to as "Patent '736"), issued in the names of Terry Dennis Claar and Gerhard Hans Schiroky, on Apr. 10, 1990, and entitled "A Method of Modifying Ceramic Composite Bodies By a Carburization Process and Articles Made Thereby", additional modification techniques are disclosed. Specifically, Patent '736 discloses that a ceramic composite body made in accordance with the teachings of, for example, Patent '130 can be modified by exposing the composite to a gaseous carburizing species. Such a gaseous carburizing species can be produced by, for example, embedding the composite body in a graphitic bedding and reacting at least a portion of the graphitic bedding with moisture or oxygen in a controlled atmosphere furnace. However, the furnace atmosphere should comprise typically, primarily, a non-reactive gas such as argon. It is not clear whether impurities present in the argon gas supply the necessary $O_2$ forming a carburizing species, or whether the argon gas merely $O_2$ for serves as a vehicle which contains impurities generated by some type of volatilization of components in the graphitic bedding or in the composite body. In addition, a gaseous carburizing species could be introduced directly into a controlled atmosphere furnace during heating of the composite body.

Once the gaseous carburizing species has been introduced into the controlled atmosphere furnace, the setup should be designed in such a manner to permit the carburizing species to be able to contact at least a portion of the surface of the composite body buried in the loosely packed graphitic powder. It is believed that carbon in the carburizing species, or carbon from the graphitic bedding, will dissolve into the interconnected zirconium carbide phase, which can then transport the dissolved carbon throughout substantially all of the composite body, if desired, by a vacancy diffusion process. Moreover, Patent '736 discloses that by controlling the time, the exposure of the composite body to the carburizing species and/or the temperature at which the carburization process occurs, a carburized zone or layer can be formed on the surface of the composite body. Such process could result in a hard, wear-resistant surface surrounding a core of composite material having a higher metal content and higher fracture toughness.

Thus, if a composite body was formed having a residual parent metal phase in the amount of between about 5-30 volume percent, such composite body could be modified by a post-carburization treatment to result in from about 0 to about 2 volume percent, typically about ½ to about 2 volume percent, of parent metal remaining in the composite body.

U.S. Pat. No. 4,885,131 (hereinafter "Patent '131"), issued in the name of Marc S. Newkirk on Dec. 5, 1989, and entitled "Process For Preparing Self-Supporting Bodies and Products Produced Thereby", discloses additional reactive infiltration formation techniques. Specifically, Patent '131 discloses that self-supporting bodies can be produced by a reactive infiltration of a parent metal into a mixture of a bed or mass comprising a boron donor material and a carbon donor material. The relative amounts of reactants and process conditions may be altered or controlled to yield a body containing varying volume percents of ceramic, metals, ratios of one ceramic or another and porosity.

In another related patent application, specifically, copending U.S. patent application Ser. No. 07/296,770 (hereinafter referred to as "Application '770"), filed in the names of Terry Dennis Claar et al., on Jan. 13, 1989, and entitled "A Method of Producing Ceramic Composite Bodies", additional reactive infiltration formation techniques are disclosed. Specifically, Application '770 discloses various techniques for shaping a bed or mass comprising boron carbide into a predetermined shape and thereafter reactively infiltrating the bed or mass comprising boron carbide to form a self-supporting body of a desired size and shape.

Copending U.S. patent application Ser. No. 07/296,837 (hereinafter referred to as "Application '837"), filed in the name of Terry Dennis Claar on Jan. 13, 1989, and entitled "A Method of Bonding A Ceramic Composite Body to a Second Body and Articles Produced Thereby", discloses various bonding techniques for bonding self-supporting bodies to second materials. Particularly, this patent application discloses that a bed or mass comprising one or more boron-containing compounds is reactively infiltrated by a molten parent metal to produce a self-supporting body. Moreover, residual or excess metal is permitted to remain bonded to the formed self-supporting body. The excess metal is utilized to form a bond between the formed self-supporting body and another body (e.g., a metal body or a ceramic body of any particular size or shape).

The reactive infiltration of a parent metal into a bed or mass comprising boron nitride is disclosed in copending U.S. Pat. No. 4,904,446 (hereinafter "Patent '446"), issued in the names of Danny Ray White et al., on Feb. 27, 1990, and entitled "Process for Preparing Self-Supporting Bodies and Products Made Thereby". Specifically, this patent discloses that a bed or mass comprising boron nitride can be reactively infiltrated by a parent metal. A relative amount of reactants and process conditions may be altered or controlled to yield a body containing varying volume percents of ceramic, metal and/or porosity. Additionally, the self-supporting body which results comprises a boron-containing compound, a nitrogen-containing compound and, optionally, a metal. Additionally, inert fillers may be included in the formed self-supporting body.

A further post-treatment process for modifying the properties of produced ceramic composite bodies is disclosed in copending U.S. patent application Ser. No. 07/296,966 (hereinafter "Application '966"), filed in the names of Terry Dennis Claar et al., on Jan. 13, 1989, and entitled "A Method of Modifying Ceramic Composite Bodies By Post-Treatment Process and Articles Produced Thereby". Specifically, Application '966 discloses that self-supporting bodies produced by a reactive infiltration technique can be post-treated by exposing the formed bodies to one or more metals and heating the exposed bodies to modify at least one property of the previously formed composite body. One specific example of a post-treatment modification step includes exposing a formed body to a siliconizing environment.

Copending U.S. patent application Ser. No. 07/296,961 (hereinafter "Application '961"), filed in the names of Terry Dennis Claar et al., on Jan. 13, 1989, and entitled "A Process for Preparing Self-Supporting Bodies Having Controlled Porosity and Graded Properties and Products Produced Thereby", discloses reacting a mixture of powdered parent metal with a bed or mass comprising boron carbide and, optionally, one or more inert fillers. Additionally, it is disclosed that both a powdered parent metal and a body or pool of molten parent metal can be induced to react with a bed or mass comprising boron carbide. The body which is produced is a body which has controlled or graded properties.

The disclosures of each of the above-discussed Commonly Owned U.S. Patent Applications and Patents are herein expressly incorporated by reference.

SUMMARY OF THE INVENTION

In accordance with a first step of the present invention, self-supporting ceramic bodies are produced by utilizing a parent metal infiltration and reaction process (i.e. reactive infiltration) in the presence of a bed or mass comprising, for example, boron carbide or boron nitride. Such bed or mass is infiltrated by molten parent metal, and the bed may be comprised entirely of boron carbide, boron nitride, and/or mixtures of boron donor materials and carbon donor materials. Depending on the particular reactants involved in the reactive infiltration, the resulting bodies which are produced comprise one or more reaction products of parent metal boron-containing compounds, and/or one or more parent metal carbon-containing compounds and/or one or more parent metal nitrogen-containing compounds, etc.

Alternatively, the mass to be infiltrated may contain one or more inert fillers admixed therewith to produce a composite by reactive infiltration, which composite comprises a matrix of one or more of the aforementioned reaction products and also may include residual unreacted or unoxidized constituents of the parent metal. The filler material may be embedded by the formed matrix. The final product may include a metal as one or more metallic constituents of the parent metal. Still further, in some cases it may be desirable to add a carbon donor material (i.e., a carbon-containing compound) and/or a boron donor material (i.e., a boron-containing compound) to the bed or mass which is to be infiltrated to modify, for example, the relative amounts of one formed reaction product to another, thereby modifying resultant mechanical properties of the composite body. Still further, the reactant concentrations and process conditions may be altered or controlled to yield a body containing varying volume percents of ceramic compounds, metal and/or porosity.

Broadly, in accordance with the first step of the method according to this invention, the bed or mass which is to be reactively infiltrated may be placed adjacent to or contacted with a body of molten metal or metal alloy, which is melted in a substantially inert environment within a particular temperature envelope. The molten metal infiltrates the mass and reacts with at least one constituent of the bed or mass to be infiltrated to form one or more reaction products. At least a portion of the formed reaction product is maintained in contact with the metal, and molten metal is drawn or transported toward the remaining unreacted mass by a wicking or capillary action. This transported metal forms additional reaction product upon contact with the remaining unreacted mass, and the formation or development of a ceramic body is continued until the parent metal or remaining unreacted mass has been consumed, or until the reaction temperature is altered to be outside the reaction temperature envelope. The resulting structure comprises, depending upon the particular materials comprising the bed or mass which is to be reactively infiltrated, one or more of a parent metal boride, a parent metal boro compound, a parent metal carbide, a parent metal nitride, a metal (which as used herein is intended to include alloys and intermetallics), or voids, or a combination thereof, and these several phases may or may not be interconnected in one or more dimensions. The final volume fractions of the reaction products and metallic phases, and the degree of interconnectivity, can be controlled by changing one or more conditions, such as the initial density of the mass to be reactively infiltrated, the relative amounts and chemical composition of the materials contained within the mass which is to be reactively infiltrated, the amount of parent metal provided for reaction, the composition of the parent metal, the presence and amount of one or more filler materials, temperature, time, etc.

Typically, the mass to be reactively infiltrated should be at least somewhat porous so as to allow for wicking the parent metal through the reaction product. Wicking occurs apparently either because any volume change on reaction does not fully close off pores through which parent metal can continue to wick, or because the reaction product remains permeable to the molten metal due to such factors as surface energy considerations which render at least some of its grain boundaries permeable to the parent metal.

In another aspect of the first step of the invention, a composite is produced by the transport of molten parent metal into the bed or mass which is to be reactively infiltrated which has admixed therewith one or more inert filler materials. In this embodiment, one or more suitable filler materials are mixed with the bed or mass to be reactively infiltrated. The resulting self-supporting ceramic-metal composite that is produced typically comprises a dense microstructure which comprises a filler embedded in a matrix comprising at least one parent metal reaction product, and also may include a substantial quantity of metal. Typically, only a small amount of material (e.g., a small mount of boron carbide) is required to promote the reactive infiltration process. Thus, the resulting matrix can vary in content from one composed primarily of metallic constituents thereby exhibiting certain properties characteristic of the parent metal; to cases where a high concentration of reaction product is formed, which dominates the properties of the matrix. The filler may serve to enhance the properties of the composite, lower the raw materials cost of the composite, or moderate the kinetics of the reaction product formation reactions and the associated rate of heat evolution. The precise starting amounts and composition of materials utilized in the reaction infiltration process can be selected so as to result in a desirable body which is compatible with the second step of the invention.

In another aspect of the first step of the present invention, the material to be reactively infiltrated is shaped into a preform corresponding to the geometry of the desired final composite. Subsequent reactive infiltration of the preform by the molten parent metal results in a composite having the net shape or near net shape of the preform, thereby minimizing expensive final machining and finishing operations. Moreover, to assist in reducing the amount of final machining and finishing operations, a barrier material can at least partially, or substantially completely, surround the preform. The use of a graphite material (e.g., a graphite mold, a graphite tape product, a graphite coating, etc.) is particularly useful as a barrier for such parent metals as zirconium, titanium, or hafnium, when used in combination with preforms made of, for example, boron carbide, boron nitride, boron and carbon. Still further, by placing an appropriate number of through-holes having a particular size and shape in the aforementioned graphite mold, the amount of porosity which typically occurs within a composite body manufactured according to the first step of the present invention, can be reduced. Typically, a plurality of holes is placed in a bottom portion of the mold, or that portion of the mold toward which reactive infiltration occurs. The holes function as a venting means which permit the removal of, for example, argon gas which has been trapped in the preform as the parent metal reactive infiltration front infiltrates the preform.

Still further, the procedures discussed above herein in the Section "Discussion of Related Patents and Patent Applications" may be applicable in connection with the first step of the present invention.

Once a self-supporting body has been formed in accordance with the first step of the present invention, then the second step of the present invention is put into effect. The second step of the present invention involves contacting at least a portion of the formed self-supporting body with a material which causes at least a portion of the metallic constituent to be at least partially removed from the self-supporting body.

In a first embodiment of the invention, a metallic constituent of a self-supporting composite body produced in accordance with the first step of the present invention can be at least partially, or substantially completely, removed by causing the metallic constituent to react with an adjacent permeable mass of material. To achieve removal of the metallic constituent, at least a portion of the permeable mass is placed into contact with at least a portion of the metallic constituent contained within the self-supporting body. Thus, at least a portion of the metallic constituent should be at least partially accessible, or should be made to be at least partially accessible, from at least one surface of the self-supporting composite body.

The amount or selected portion of metallic constituent which is caused to be removed from the self-supporting body can be controlled to achieve a desirable metal content. Specifically, substantially all metallic constituent located in a certain area within a self-supporting composite body (e.g., located near a surface of the self-supporting composite body) may be substantially completely removed from that selected area, thereby leaving other areas of metallic constituent within the composite body substantially undisturbed. Moreover, if the metallic constituent is substantially interconnected throughout the composite body, substantially all the metallic constituent could be removed. The volumetric amount of metallic constituent to be removed from the self-supporting composite body depends upon the ultimate application for the composite body. Thus, the present invention may be utilized merely as a surface modification process, or it could be used to remove substantially all the metallic constituent from a self-supporting composite body.

In a preferred embodiment, the second step of the present invention, the self-supporting body may be substantially completely surrounded by and contacted with an appropriate material. In this embodiment, at least a portion of, or substantially all of, the metallic constituent could be removed from substantially all surfaces of the self-supporting body so long as the metallic constituent is at least partially accessible, or can be made to be at least partially accessible from such surfaces.

In another preferred embodiment of the second step of the present invention, only a portion of the self-supporting body may be contacted with the appropriate mass of material. In this preferred embodiment, the metallic constituent could be selectively remove from that surface which is in contact with the permeable mass. In this preferred embodiment, it is possible to achieve a grading of properties within a self-supporting body from one side of the body relative to another side of the body. Such grading could permit the self-supporting body to be used for a number of different applications.

A number of materials may be placed into contact with self-supporting bodies formed in accordance with the first step of the present invention. Acceptable materials include carbide, nitrides, borides, etc. A primary selection criteria for the material comprising the permeable mass is that the permeable mass should be wetable by the metallic component of the self-supporting body. Moreover, the permeable mass can be selected so that it is substantially nonreactive with or very reactive with the metallic component of the self-supporting body. In the case where the permeable mass is selected so that it is substantially nonreactive with the metallic constituent comprising a self-supporting body, very little conversion of metallic constituent to another phase can be expected; whereas if a metallic constituent is reactive with a material in the permeable mass, partial conversion of the metallic constituent to another material can be expected.

As stated above, the amount of metallic constituent that is removed from a self-supporting body can be controlled to be within any particular desirable range. For example, if a self-supporting body was formed to contain about 20 volume percent metallic constituent, substantially all of the metallic constituent could be removed by following the teachings of the present invention. Additionally, it has been observed, that when the material comprising the permeable mass is substantially nonreactive (e.g., chemically) with metallic constituent contained in the self-supporting body, that substantially no conversion of metallic constituent to another material occurs. But rather, substantially complete removal of the metallic constituent from the self-supporting body is essentially all that occurs. This fact has been proven by quantitative image analysis.

DEFINITIONS

As used in this specification and the appended claims, the terms below are defined as follows:

"Parent metal" refers to that metal, e.g. zirconium, which is the precursor for the polycrystalline oxidation reaction product, that is, the parent metal boride, parent metal nitride, or other parent metal compound, and includes that metal as a pure or relatively pure metal, a commercially available metal having impurities and/or alloying constituents therein, and an alloy in which that metal precursor is the major constituent; and when a specific metal is mentioned as the parent metal, e.g. zirconium, the metal identified should be read with this definition in mind unless indicated otherwise, by the context.

"Parent metal boride" and "parent metal boro compounds" mean a reaction product containing boron formed upon reaction between boron nitride and the parent metal and includes a binary compound of boron with the parent metal as well as ternary or higher order compounds.

"Parent metal nitride" means a reaction product containing nitrogen formed upon reaction of boron nitride and parent metal.

"Parent metal carbide" means a reaction product containing carbon formed upon reaction of a carbon source and parent metal.

DETAILED DESCRIPTION OF THE INVENTION AND PREFERRED EMBODIMENTS

Figure 1:
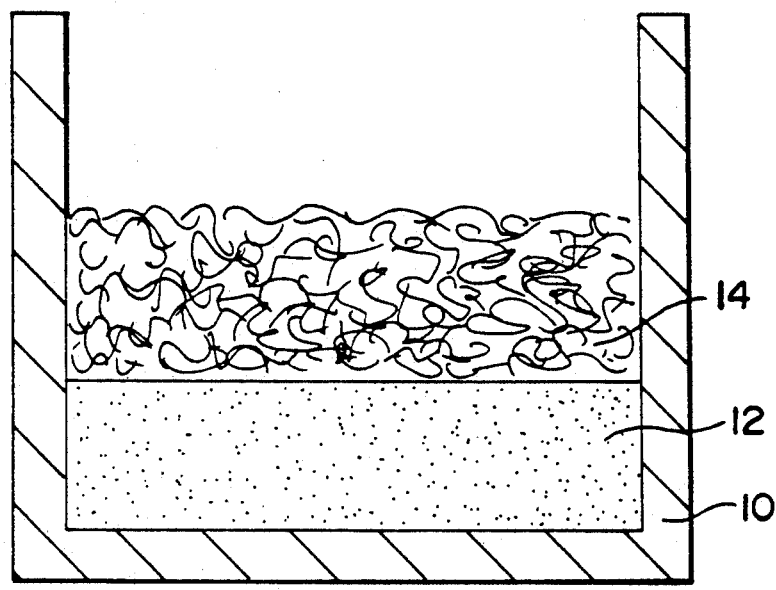
FIG. 1 is a schematic view of the setup used to fabricate a platelet reinforced composite body.

In accordance with a first step of the present invention, self-supporting ceramic bodies are produced by utilizing a parent metal infiltration and reaction process (i.e. reactive infiltration) in the presence of a bed or mass comprising, for example, boron carbide or boron nitride. Such bed or mass is infiltrated by molten parent metal, and the bed may be comprised entirely of boron carbide, boron nitride, and/or mixtures of boron donor materials and carbon donor materials. Depending on the particular reactants involved in the reactive infiltration, the resulting bodies which are produced comprise one or more reaction products of parent metal boron-containing compounds, and/or one or more parent metal carbon-containing compounds and/or one or more parent metal nitrogen-containing compounds, etc. Alternatively, the mass to be infiltrated may contain one or more inert fillers admixed therewith to produce a composite by reactive infiltration, which composite comprises a matrix of one or more of the aforementioned reaction products and also may include residual unreacted or unoxidized constituents of the parent metal. The filler material may be embedded by the formed matrix. The final product may include a metal such as one or more metallic constituents of the parent metal. Still further, in some cases it may be desirable to add a carbon donor material (i.e., a carbon-containing compound) and/or a boron donor material (i.e., a boron-containing compound) to the bed or mass which is to be infiltrated to modify, for example, the relative amounts of one formed reaction product to another, thereby modifying resultant mechanical properties of the composite body. Still further, the reactant concentrations and process conditions may be altered or controlled to yield a body containing varying volume percents of ceramic compounds, metal and/or porosity.

Broadly, in accordance with the first step of the method according to this invention, the bed or mass which is to be reactively infiltrated may be placed adjacent to or contacted with a body of molten metal or metal alloy, which is melted in a substantially inert environment within a particular temperature envelope. The molten metal infiltrates the mass and reacts with at least one constituent of the bed or mass to be infiltrated to form one or more reaction products. At least a portion of the formed reaction product is maintained in contact with the metal, and molten metal is drawn or transported toward the remaining unreacted mass by a wicking or capillary action. This transported metal forms additional reaction product upon contact with the remaining unreacted mass, and the formation or development of a ceramic body is continued until the parent metal or remaining unreacted mass has been consumed, or until the reaction temperature is altered to be outside the reaction temperature envelope. The resulting structure comprises, depending upon the particular materials comprising the bed or mass which is to be reactively infiltrated, one or more of a parent metal boride, a parent metal boro compound, a parent metal carbide, a parent metal nitride, a metal (which as used herein is intended to include alloys and intermetallics), or voids, or a combination thereof, and these several phases may or may not be interconnected in one or more dimensions. The final volume fractions of the reaction products and metallic phases, and the degree of interconnectivity, can be controlled by changing one or more conditions, such as the initial density of the mass to be reactively infiltrated, the relative amounts and chemical composition of the materials contained within the mass which is to be reactively infiltrated, the amount of parent metal provided for reaction, the composition of the parent metal, the presence and amount of one or more filler materials, temperature, time, etc.

Typically, the mass to be reactively infiltrated should be at least somewhat porous so as to allow for wicking the parent metal through the reaction product. Wicking occurs apparently either because any volume change on reaction does not fully close off pores through which parent metal can continue to wick, or because the reaction product remains permeable to the molten metal due to such factors as surface energy considerations which render at least some of its grain boundaries permeable to the parent metal.

In another aspect of the first step of the invention, a composite is produced by the transport of molten parent metal into the bed or mass which is to be reactively infiltrated which has admixed therewith one or more inert filler materials. In this embodiment, one or more suitable filler materials are mixed with the bed or mass to be reactively infiltrated. The resulting self-supporting ceramic-metal composite that is produced typically comprises a dense microstructure which comprises a filler embedded by a matrix comprising at least one parent metal reaction product, and also may include a substantial quantity of metal. Typically, only a small amount of material (e.g., a small mount of boron carbide) is required to promote the reactive infiltration process. Thus, the resulting matrix can vary in content from one composed primarily of metallic constituents thereby exhibiting certain properties characteristic of the parent metal; to cases where a high concentration of reaction product is formed, which dominates the properties of the matrix. The filler may serve to enhance the properties of the composite, lower the raw materials cost of the composite, or moderate the kinetics of the reaction product formation reactions and the associated rate of heat evolution. The precise starting amounts and composition of materials utilized in the reaction infiltration process can be selected so as to result in a desirable body which is compatible with the second step of the invention.

In another aspect of the first step of the present invention, the material to be reactively infiltrated is shaped into a preform corresponding to the geometry of the desired final composite. Subsequent reactive infiltration of the preform by the molten parent metal results in a composite having the net shape or near net shape of the preform, thereby minimizing expensive final machining and finishing operations. Moreover, to assist in reducing the amount of final machining and finishing operations, a barrier material can at least partially, or substantially completely, surround the preform. The use of a graphite material (e.g., a graphite mold, a graphite tape product, a graphite coating, etc.) is particularly useful as a barrier for such parent metals as zirconium, titanium, or hafnium, when used in combination with preforms made of, for example, boron carbide, boron nitride, boron and carbon. Still further, by placing an appropriate number of through-holes having a particular size and shape in the aforementioned graphite mold, the amount of porosity which typically occurs within a composite body manufactured according to the first step of the present invention, can be reduced. Typically, a plurality of holes is placed in a bottom portion of the mold, or that portion of the mold toward which reactive infiltration occurs. The holes function as a venting means which permit the removal of, for example, argon gas which has been trapped in the preform as the parent metal reactive infiltration front infiltrates the preform.

Still further, the procedures discussed above herein in the Section "Discussion of Related Patents and Patent Applications" may be applicable in connection with the first step of the present invention.

Once a self-supporting body has been formed in accordance with the first step of the present invention, then the second step of the present invention is put into effect. The second step of the present invention involves contacting at least a portion of the formed self-supporting body with a material which causes at least a portion of the metallic constituent to be at least partially removed from the self-supporting body.

In a first embodiment of the invention, a metallic constituent of a self-supporting composite body produced in accordance with the first step of the present invention can be at least partially, or substantially completely, removed by causing the metallic constituent to react with an adjacent permeable mass of material. To achieve removal of the metallic constituent, at least a portion of the permeable mass is placed into contact with at least a portion of the metallic constituent contained within the self-supporting body. Thus, at least a portion of the metallic constituent should be at least partially accessible, or should be made to be at least partially accessible, from at least one surface of the self-supporting composite body.

The amount or selected portion of metallic constituent which is caused to be removed from the self-supporting body can be controlled to achieve a desirable metal content. Specifically, substantially all metallic constituent located in a certain area within a self-supporting composite body (e.g., located near a surface of the self-supporting composite body) may be substantially completely removed from that selected area, thereby leaving other areas of metallic constituent within the composite body substantially undisturbed. Moreover, if the metallic constituent is substantially interconnected throughout the composite body, substantially all the metallic constituent could be removed. The volumetric amount of metallic constituent to be removed from the self-supporting composite body depends upon the ultimate application for the composite body. Thus, the present invention may be utilized merely as a surface modification process, or it could be used to remove substantially all the metallic constituent from a self-supporting composite body.

In a preferred embodiment, the second step of the present invention, the self-supporting body may be substantially completely surrounded by and contacted with an appropriate material. In this embodiment, at least a portion of, or substantially all of, the metallic constituent could be removed from substantially all surfaces of the self-supporting body so long as the metallic constituent is at least partially accessible, or can be made to be at least partially accessible from such surfaces.

In another preferred embodiment of the second step of the present invention, only a portion of the self-supporting body may be contacted with the appropriate mass of material. In this preferred embodiment, the metallic constituent could be selectively removed from that surface which is in contact with the permeable mass. In this preferred embodiment, it is possible to achieve a grading of properties within a self-supporting body from one side of the body relative to another side of the body. Such grading could permit the self-supporting body to be used for a number of different applications.

A number of materials may be placed into contact with self-supporting bodies formed in accordance with the first step of the present invention. Acceptable materials include carbide, nitrides, borides, etc. A primary selection criteria for the material comprising the permeable mass is that the permeable mass should be wetable by the metallic component of the self-supporting body. Moreover, the permeable mass can be selected so that it is substantially nonreactive with or very reactive with the metallic component of the self-supporting body. In the case where the permeable mass is selected so that it is substantially nonreactive with the metallic constituent comprising a self-supporting body, very little conversion of metallic constituent to another phase can be expected; whereas if a metallic constituent is reactive with a material in the permeable mass, partial conversion of the metallic constituent to another material can be expected.

As stated above, the amount of metallic constituent that is removed from a self-supporting body can be controlled to be within any particular desirable range. For example, if a self-supporting body was formed to contain about 20 volume percent metallic constituent, substantially all of the metallic constituent could be removed by following the teachings of the present invention. Additionally, it has been observed, that when the material comprising the permeable mass is substantially nonreactive (e.g., chemically) with metallic constituent contained in the self-supporting body, that substantially no conversion of metallic constituent to another material occurs. But rather, substantially complete removal of the metallic constituent from the self-supporting body is essentially all that occurs. This fact has been proven by quantitative image analysis.

The following are examples of the present invention. The Examples are intended to be illustrative of various aspects of the present invention, however, these examples should not be construed as limiting the scope of the invention.

EXAMPLE 1

Figure 2:
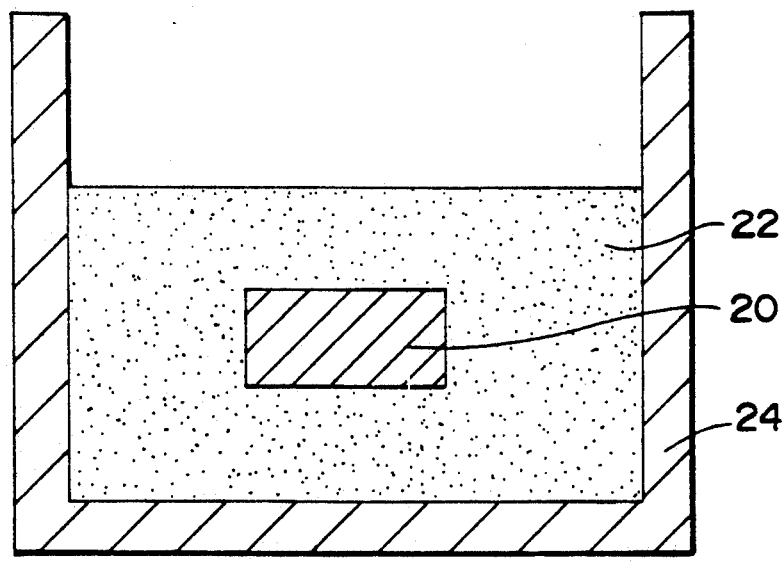
FIG. 2 is a schematic view of the setup used to remove the residual metal from the platelet reinforced composite body.

This Example demonstrates a technique for removing the residual metallic constituent from a platelet reinforced composite body. A lay-up used to form the platelet reinforced composite body is shown in FIG. 1. The lay-up used to remove the residual metallic constituent from the formed platelet reinforced composite body is shown in FIG. 2.

About 600 grams of methylene chloride (JT Baker, Inc., Phillipsburg, N.J.) was poured into an approximately ½ gallon (2 liter) NALGENE ® jar (Nalge Company, Rochester, N.Y.). About 4 grams of XUS 40303.00 Experimental Binder (Dow Chemical Company, Midland, Mich.) was added to the methylene chloride and allowed to dissolve. About 400 grams of 1000 grit TETRABOR ® boron carbide particulate (ESK Engineered Materials, New Canaan, Conn.) having an average particle size of about 5 microns was stirred into the solution of binder and methylene chloride to form a slurry.

As shown in FIG. 1, a grade ATJ graphite mold 10 (Union Carbide Corporation, Carbon Products Division, Cleveland, Ohio) having inner dimensions measuring about 3.0 inches (76 mm) square and about 4.0 inches (102 mm) high, was filled with methylene chloride (JT Baker Inc., Phillipsburg, N.J.) and placed into a drying box at substantially room temperature for about one hour to allow the methylene chloride solvent to saturate the graphite mold 10. After soaking for about an hour, the residual methylene chloride was poured out, and a quantity of the slurry containing the boron carbide particulate was sediment cast into the saturated graphite mold 10. The graphite mold 10 containing the sediment cast boron carbide preform 12 were placed back into the drying box and allowed to dry overnight.

The graphite mold 10 and the dried sediment cast preform 12 were then fired in a resistance heated controlled atmosphere furnace to remove the binder from the preform. Specifically, the graphite mold 10 and its contents was placed into the furnace chamber, which was then evacuated to about 30 inches (762 mm) of mercury vacuum, and then back-filled with argon gas. After repeating this evacuation and back-filling procedure, an argon gas flow rate of about two liters per minute at an over pressure of about 1 psi (7 kPa) was established. The furnace temperature was then increased from substantially room temperature to a temperature of about 250° C. at a rate of about 44° C. per hour. Upon reaching a temperature of about 250° C., the temperature was then increased to about 300° C. at a rate of about 50° C. per hour. Upon reaching a temperature of about 300° C., the temperature was then increased to about 400° C. at a reduced rate of about 10° C. per hour. Upon reaching a temperature of about 400° C., the temperature was then increased to about 600° C. at a rate of about 50° C. per hour. After maintaining a temperature of about 600° C. for about four hours, the ceramic binder had been substantially completely removed from the sediment cast preform, and the furnace was then cooled to substantially room temperature at a rate of about 200° C. per hour. After cooling to substantially room temperature, the graphite mold 10 and sediment cast preform 12 were removed from the furnace. The weight of the preform 12 itself was found to be about 80 grams and the preform thickness was calculated to about 0.46 inch (12 mm). The bulk density of the sediment cast boron carbide preform 12 was calculated to about 1.18 grams per cubic centimeter, corresponding to a theoretical density of about 46.8%.

About 534.6 grams of zirconium sponge 14, (Consolidated Astronautics, Inc., a division of United-Guardian Corp., Hauppage, N.Y.) was poured on top of the sediment cast boron carbide preform 12 in the graphite mold 10 and the zirconium levelled to form a lay-up.

The lay-up comprising the graphite mold 10 and its contents were placed into a vacuum furnace. The furnace chamber was evacuated to about 30 inches (762 mm) of mercury vacuum and then back-filled with argon gas. After repeating this evacuation and back-filling procedure, an argon gas flow rate of about two liters per minute was established through the furnace at an over pressure of about 2 psi (14 kPa). The furnace temperature was then increased from about room temperature to a temperature of about 1900° C. at a rate of about 375° C. per hour. After maintaining a temperature of about 1900° C. for about two hours, reactive infiltration of the boron carbide preform by the molten zirconium metal was substantially complete. Accordingly, the furnace temperature was decreased to substantially room temperature at a rate of about 900° C. per hour. After cooling to substantially room temperature, the graphite mold 10 and its contents were removed from the furnace. The platelet reinforced composite body formed by the reactive infiltration of the zirconium metal into the sediment cast boron carbide preform 12 weighed about 601 grams and measured about 3.0 inches (76 mm) square by about 0.73 inch (18.5 mm) thick. The formed body comprised zirconium diboride, zirconium carbide, and a metallic constituent comprising residual zirconium alloy.

A portion of the formed platelet reinforced composite was sectioned using electro-discharge machining, mounted in a thermoplastic polymer and polished using diamond polishing compound in preparation for examination by optical microscopy. Quantitative image analysis of the polished sample showed a residual metal content of about 16.3%.

A coupon 20 of the platelet reinforced composite body was machined from the formed 3.0 inches (76 mm) square tile using electro-discharge machining. The machined coupon 20 weighed about 2.13 grams and measured about 21.6 mm long by about 16.4 mm wide by about 1.1 mm thick.

Zirconium carbide particulate 22 (−325 mesh, Atlantic Equipment Engineers, Bergenfield, N.J.) having substantially all particles smaller than about 45 microns in diameter was poured into a grade ATJ graphite crucible 24 (Union Carbide Corporation, Carbon Products Division, Cleveland, Ohio) measuring in its interior about 2.0 inches (51 mm) square by about 3.0 inches (76 mm) high to a depth of about 1.0 inch (25 mm). The machined coupon 20 of the platelet reinforced composite material was placed flat onto the levelled surface of the zirconium carbide particulate material 22. Additional zirconium carbide particulate 22 was added to the graphite crucible to substantially completely cover the coupon 20 of platelet reinforced composite material until a total depth of zirconium particulate 22 of about 2.0 inches (51 mm) was realized.

The graphite crucible 24 and its contents was then placed into a resistance heated controlled atmosphere furnace. The furnace chamber was evacuated to about 30 inches (762 mm) of mercury vacuum and then back-filled with argon gas. An argon gas flow rate of about two liters per minute was established through the furnace at an over pressure of about 2 psi (14 kPa). The furnace temperature was then increased from substantially room temperature to a temperature of about 1800° C. at a rate of about 400° C. per hour. After maintaining a temperature of about 1800° C. for about one hour, the temperature was then decreased at a rate of about 350° C. per hour. After the temperature had been reduced to substantially room temperature, the graphite crucible 24 and its contents were removed from the furnace and disassembled.

Figure 3:
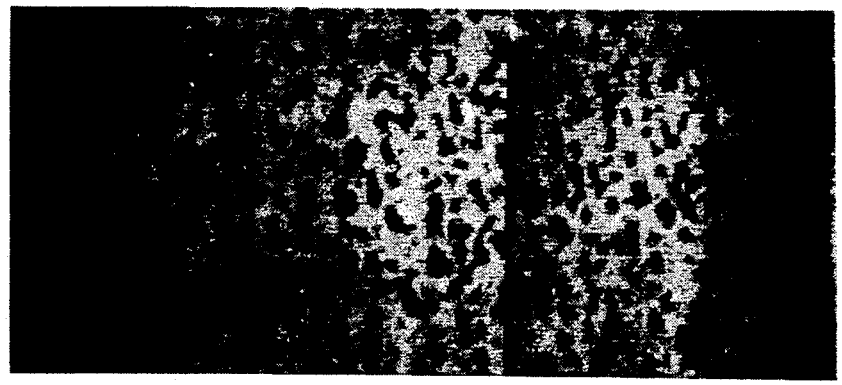
FIG. 3 is an approximately 100× magnification photomicrograph of a cross-section of the platelet reinforced composite body after the metal remove process.

The coupon 20 of the platelet reinforced composite body which was recovered was mounted and polished for examination in the optical microscope in substantially the same manner as was the originally formed platelet reinforced composite body. FIG. 3 is an approximately 100× magnification photomicrograph showing a surface layer attached to the original platelet reinforced composite body comprising zirconium carbide and some zirconium diboride. Adjacent to the surface layer, is a thin layer comprising zirconium diboride, zirconium carbide, and porosity but no residual metal. The porosity appeared to be interconnected. Beneath this thin layer was a microstructure comprising zirconium diboride and zirconium carbide. Quantitative image analysis of the underlying microstructure reported only about 0.26% residual metal and about 0.35% porosity.

The volume fraction ratio of zirconium diboride to zirconium carbide within the underlying microstructure as determined also by quantitative image analysis, was recorded before and after the second heating to remove the metallic constituent from the body. The ratio was found to be substantially unchanged, indicating that the residual metal in the platelet reinforced composite had not carburized upon heating in a zirconium carbide environment. Moreover, the almost complete disappearance of residual metal from the original platelet reinforced composite body may be attributed to physical removal of such metal from the body. That substantially no porosity was seen in the platelet reinforced composite body following the metal removal process indicates that some shrinkage or sintering of the body may have occurred. Specifically, it appeared that the body decreased in volume by about 16%.

This Example thus illustrates a technique for removing the residual metal from a platelet reinforced composite body. The relative amounts of the zirconium diboride and zirconium carbide phases are left substantially unchanged. Furthermore, the body may maintain substantially full density through a shrinkage mechanism.

What is claimed is:

1. A method for removing at least a portion of a metallic constituent from a self-supporting composite body, said self-supporting composite body being made by a process comprising: (i) heating a parent metal in a substantially inert atmosphere to a temperature above its melting point to form a body of molten parent metal; (ii) contacting said body of molten parent metal with a first permeable mass which is to be reactively infiltrated; (iii) maintaining said temperature for a time sufficient to permit infiltration of molten parent metal into said first permeable mass which is to be reactively infiltrated and to permit substantial reaction of said molten patent metal with said first permeable mass to form at least one boron-containing compound; (iv) containing said infiltration reaction for a time sufficient to produce said at least one self-supporting composite body comprising at least one parent metal boron-containing compound and at least one metallic constituent of said parent metal which is at least partially accessible from at least one surface of said composite body, said method comprising the steps of:
contacting at least a portion of said at least one self-supporting composite body with a second permeable mass which is capable of reacting with at least a portion of said metallic constituent in said self-supporting composite body;
heating said at least one self-supporting composite body and said second permeable mass to cause at least a portion of said at least one metallic constituent to infiltrate and react with at least a portion of said second permeable mass to form a reaction product of said at least one metallic constituent exterior to said composite body, thereby removing said at least a portion of said at least one metallic constituent from said self-supporting composite body; and
continuing said removing of said at least one metallic constituent for a time sufficient to remove a desired amount of said at least one metallic constituent.

2. The method of claim 1, wherein said permeable mass substantially completely surrounds said composite body.

3. The method of claim 1, wherein said permeable mass contacts substantially only one side of said composite body.

4. The method of claim 1, wherein said permeable mass comprises a ceramic particulate.

5. The method of claim 4, wherein the metallic constituent of the composite body is selectively removed from only that portion of the composite body which contacts said permeable mass.

6. The method of claim 1, wherein substantially all of said metallic constituent is removed.

7. The method of claim 1, wherein said metallic constituent is selectively removed from only a portion of the composite body such that a grading of at least one property within said self-supporting body is achieved.

8. The method of claim 1, wherein said second permeable mass comprises at least one material selected from the group consisting of carbides, borides, and nitrides.

9. The method of claim 1, wherein said parent metal comprises at least one metal selected from the group consisting of hafnium, titanium and zirconium.

10. The method of claim 1, wherein said first permeable mass comprises at least one material selected from the group consisting of boron carbide, boron nitride, and mixtures of boron-donor materials and carbon-donor materials.

11. The method of claim 1, wherein said parent metal comprises at least one metal selected from the group consisting of aluminum, silicon, titanium, hafnium, lanthanum, iron, calcium, vanadium, niobium, magnesium and beryllium.

12. The method of claim 1, wherein said first permeable mass further comprises at least one inert filler material.

13. A method for removing at least one metallic component of a metallic constituent contained within a multi-phase composite body comprising:
contacting at least a portion of a surface of said multi-phase composite body with a permeable mass, said at least one metallic constituent being capable of reacting with at least a portion of said permeable mass; and
infiltrating and reacting at least a portion of the permeable mass with said at least one metallic component of said metallic constituent, thereby reducing the amount of metallic constituent in the multi-phase composite body.

14. The method of claim 13, wherein said permeable mass substantially completely surrounds said composite body.

15. The method of claim 13, wherein said permeable mass contacts substantially only one side of said composite body.

16. The method of claim 13, wherein said permeable mass comprises a ceramic particulate.

17. The method of claim 16, wherein the metallic constituent of the composite body is selectively removed from only that portion of the composite body which contacts said permeable mass.

18. The method of claim 13, wherein substantially all of said metallic constituent is removed.

19. The method of claim 13, wherein said metallic constituent is selectively removed from only a portion of the composite body such that a grading of at least one property within said self-supporting body is achieved.

20. The method of claim 13, wherein said permeable mass comprises at least one material selected from the group consisting of carbides, borides, and nitrides.

* * * * *